(12) United States Patent
Takanishi et al.

(10) Patent No.: US 6,750,313 B2
(45) Date of Patent: Jun. 15, 2004

(54) RESIN COMPOSITION AND ARTICLES MOLDED THEREFROM

(75) Inventors: Keijiro Takanishi, Shiga (JP); Takuya Kumagai, Shizuoka (JP); Ryouichi Ishinabe, Shiga (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/130,643

(22) PCT Filed: Sep. 6, 2001

(86) PCT No.: PCT/JP01/07735

§ 371 (c)(1),
(2), (4) Date: May 20, 2002

(87) PCT Pub. No.: WO02/24787

PCT Pub. Date: Mar. 28, 2002

(65) Prior Publication Data

US 2003/0013836 A1 Jan. 16, 2003

(30) Foreign Application Priority Data

Sep. 22, 2000 (JP) .......................................... 2000-288254

(51) Int. Cl.$^7$ .............................................. C08G 64/00
(52) U.S. Cl. .................... 528/196; 264/176.1; 264/219; 359/642; 428/411.1; 428/412; 528/198
(58) Field of Search .............................. 528/196, 198; 359/642; 428/411, 411.1, 412; 264/176.1, 219

(56) References Cited

U.S. PATENT DOCUMENTS

| | | | | |
|---|---|---|---|---|
| 3,378,523 A | * | 4/1968 | Cladwell et al. | ............ 528/168 |
| 4,322,520 A | | 3/1982 | Schmidt et al. | |
| 4,401,802 A | | 8/1983 | Schmidt et al. | |
| 4,719,279 A | | 1/1988 | Kauth et al. | |

FOREIGN PATENT DOCUMENTS

| | | |
|---|---|---|
| GB | 1025422 | 4/1966 |
| JP | 61238826 | 10/1986 |
| WO | WO 01/34683 A1 | 5/2001 |

* cited by examiner

*Primary Examiner*—Terressa Boykin
(74) *Attorney, Agent, or Firm*—Piper Rudnick LLP

(57) ABSTRACT

A resin composition having a high refractive index and low dispersion characteristics including a carbonate residue, a phosphonic acid residue and a dihydric phenol residue, wherein the mol fractions of the phosphonic acid residue and the carbonate residue satisfy $$1 > (a)/\{(a)+(b)\} \geq 0.5$$

wherein (a) represents the number of moles of the phosphonic acid residues, and (b) represents the number of moles of the carbonate residues.

19 Claims, No Drawings

RESIN COMPOSITION AND ARTICLES MOLDED THEREFROM

TECHNICAL FIELD

The present invention relates to one or more than one resin composition having a low level of optical dispersion and a high refractive index and a molded product containing the same.

BACKGROUND ART

Various materials have been applied as colorless and transparent materials according to a variety of uses including optical lenses, functional optical films, disc substrates and the like, but those materials are required to have even higher and better function and performance due to the rapid developments in the fields of health-care and electronics.

An optical lens is one of the health-care applications for optical materials, and the development of these materials has been actively carried out to provide a thinner, lighter and more fashionable lens, and presently, resin lenses command a 90% share of the market due to their advantages such as high impact resistance and light weight.

Conventional resins for optical lenses can be divided into three main groups, i.e. CR39, acrylic, and urethane. Many kinds of resins have been developed for commercial use with the objective of a low level of optical dispersion and a high refractive index. All of these resins are thermosetting, and they are molded into optical lenses by a cast molding process; however, this method has a problem of high manufacturing costs, since the polymerization time is long and a subsequent annealing step is required. The use of a thermoplastic resin such as polycarbonate for an optical lens can reduce the production cost, to a much lower level compared to that of the thermosetting resin due to its good moldability; however, the performance of the resulting vision-correcting eye glasses is insufficient due to the resin's low refractive index (1.58). There are many thermoplastic resins which are known to have higher refractive indices than that of the polycarbonate, but they have problems when used for optical lenses, such as a high level of optical dispersion and staining.

On the other hand, transparent and colorless thermoplastic resins such as polycarbonate have also been widely employed in the field of electronics. Such applications include an optical film such as an optical retardation film and a substrate for a disc. The optical retardation film is one of the important components of a full-color reflective liquid crystal display and determines the contrast, but currently-employed polycarbonates (Japanese Patent Laid-Open Nos. Hei 4-204503, and Hei 9-304619) possess less-than-satisfactory wavelength dispersion characteristics. For a full color reflective liquid crystal display of high contrast, improvement in the wavelength dispersion characteristics of the resin film used as the optical retardation film has been one of the technical problems to be solved.

DISCLOSURE OF THE INVENTION

The present invention aims at providing a resin composition having excellent optical characteristics including high transparency, high refractive index, and low optical dispersion, and a molded product thereof. In order to solve the above-mentioned problems, the present invention has the following construction. Namely, a resin composition comprised of a carbonate residue, a phosphonic acid residue represented by the following structural formula (1), and a dihydric phenol residue represented by the following structural formula (2) is provided, wherein the mol fractions of the phosphonic acid residue and the carbonate residue satisfy equation (3).

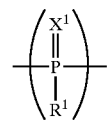

(1)

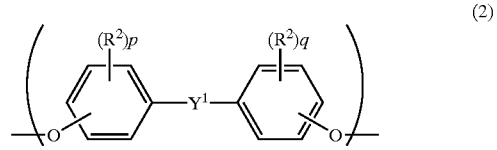

(2)

[In structural formula (1), R1 represents an organic group, X1 represents oxygen, sulfur or selenium, and the resin composition may contain two or more different phosphonic acid residues having different R1 or X1. In structural formula (2), R2 is independently selected from the group consisting of a hydrogen atom, a halogen atom, a hydrocarbyl group and a nitro group, p and q are integers such that p+q=0 to 8, and the hydrocarbyl group is selected from the group consisting of an aliphatic group having 1–20 carbon atoms, and an aromatic group. Y1 is selected from the group consisting of a single bond, an oxygen atom, a sulfur atom, an alkylene group, an alkylidene group, a cycloalkylene group, a cycloalkylidene group, a halo-substituted alkylene group, a halo-substituted alkylidene group, a phenylalkylidene group, a carbonyl group, a sulfone group, an aliphatic phosphine oxide group, an aromatic phosphine oxide group, an alkylsilane group, a dialkylsilane group, and a fluorene group. The resin composition may contain two or more different dihydric phenol residues having different R2 or Y1.]

$$1 > (a)/\{(a)+(b)\} \geq 0.5 \tag{3}$$

[In equation (3), (a) represents the number of moles of the phosphonic acid residues, and (b) represents the number of moles of the carbonate residues.]

According to the present invention, a resin composition which comprises a phosphonic acid residue represented by the following structural formula (4), and a dihydric phenol residue represented by the following structural formula (5) is also provided.

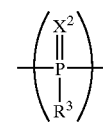

(4)

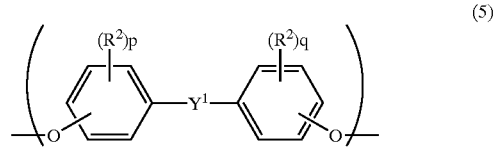

(5)

[In structural formula (4), R3 represents an organic group, X2 represents sulfur or selenium, and the resin composition may contain two or more different phosphonic acid residues having different R3 or X2. In structural formula (5), R4 is independently selected from the group consisting of a hydrogen atom, a halogen atom, a hydrocarbyl group and a nitro group, and p and q are integers such that p+q=0 to 8, and the hydrocarbyl group is selected from the group consisting of an aliphatic group having 1–20 carbon atoms, and an aromatic group. Y2 is selected from the group consisting of a single bond, an oxygen atom, a sulfur atom, an alkylene group, an alkylidene group, a cycloalkylene group, a cycloalkylidene group, a halo-substituted alkylene group, a halo-substituted alkylidene group, a phenylalkylidene group, a carbonyl group, a sulfone group, an aliphatic phosphine oxide group, an aromatic phosphine oxide group, an alkylsilane group, a dialkylsilane group, and a fluorene group. The resin composition may contain two or more different dihydric phenol residues having different R4 or Y2.]

BEST MODE FOR CARRYING OUT THE INVENTION

As a result of extensive examination in search of a thermoplastic resin having a high refractive index and low dispersion, the present inventors have found that a colorless and transparent thermoplastic resin having a high refractive index and low dispersion can be obtained by introducing a structure having a pentavalent phosphorus atom, in particular a phosphonic acid structure, into the main chain of a polymer. Equation (3) represents the copolymerization fraction of the phosphonic acid residue, wherein (a). represents the number of moles of the phosphonic acid residue represented by structural formula (1), and (b) represents the number of moles of the carbonate residue. When the mol fraction of the phosphonic acid residue represented by formula (1) is below 0.5, the polymer does not show a high refractive index, thereby the advantages of the present invention are barely attained. A mol fraction of the phosponic acid residue within the range of $[(a)/\{(a)+(b)\}] \geq 0.75$ is preferred.

Abbe numbers are generally employed as an index to show the level of optical dispersion of an optical material and calculated according to the following equation (6).

$$\text{Abbe number } (\nu d) = (nd-1)/(nf-nc) \quad (6)$$

Wherein, nd represents the d-line refractive index (wavelength: 587.6 nm), nf represents the f-line refractive index (wavelength: 656.3 nm), and nc represents the c-line refractive index (wavelength: 486.1 nm).

Therefore, higher Abbe numbers are indicative of lower dispersion.

Various resins having phosphorus-type functional groups are known; particularly, the resins containing phosphonic acid ester groups in the main chain are referred to as polyphosphonates (K. S. Kim, J. Appl. Polym. Sci., 28, 1119 (1983); Y. Imai et al, Makromol. Chem., Rapid Commun., 1, 419 (1980); U.S. Pat. No. 3,719,727), and have been actively studied in view of their flame retardant properties. As no detailed findings regarding the physical properties of these known polyphosphonate resins including the optical characteristics and dynamic characteristics were available, the present inventors have synthesized them and conducted evaluations of their physical properties. As a result, those known polyphosphonate resins were found to have insufficient dynamic characteristics, unsatisfactory refractive indices or optical dispersion characteristics, due to their low molecular weights. As a result of extensive studies with the objective of improving such inferior characteristics, the present inventors achieved this invention. The present inventors found that a molded product containing the resin of the present invention in the form of a gut, plate or film, has excellent flame resistance as well.

In addition to that, the present inventors found that the resin of the present invention shows excellent birefringence/wavelength dispersion characteristics when it is formed into an optically anisotropic mold for use as an optical retardation film (or an optical retardation plate, a λ/4 plate, or a circularly polarizing plate). When light is transmitted through an optically anisotropic product, such as a uniaxially stretched film, of a typical resin, the shorter the wavelength of the light is, the greater the birefringence becomes, and the degree of the increase is greater in a region of short wavelength. For use as an optical retardation film, a resin satisfying the following conditions with regard to the relation between the birefringence and the wavelength is ideal from the optical point of view. That is, 1) the resin in the form of a film having a thickness of up to a few hundred microns has a satisfactory level of birefringence, and
2) the change in the birefringence is constant regardless of the wavelength, i.e. the relation between the birefringence and the wavelength is proportional (linear relationship).

A combination of two kinds of optically anisotropic films which satisfy these conditions and have different birefringence/wavelength dispersion characteristics makes an ideal optical retardation film. The present inventors have found that an optically anisotropic product obtained by stretching a film produced from the resin of the present invention shows a more linear birefringence/wavelength relation than conventional resins, and that an optical retardation film having excellent wavelength dispersion characteristics can be obtained by combining the stretched film of the present invention with an optically anisotropic film of a conventional polyalkane resin.

Examples of substituents R1 or R3 on the phosphorus atom of a compound represented by the above-mentioned structural formula (1) or (4) include groups such as phenyl, halo-substituted phenyl, methoxy phenyl, ethoxy phenyl, ethyl, isopropyl, cyclohexyl, vinyl, allyl, benzyl, aminoalkyl, hydroxyalkyl, halo-substituted alkyl, alkylsulfide and the like. Examples of the phosphonic acid constituting the phosphonic acid residue represented by structural formula (1) include methyl phosphonic acid, ethyl phosphonic acid, n-propyl phosphonic acid, isopropyl phosphonic acid, n-butyl phosphonic acid, isobutyl phosphonic acid, t-butyl phosphonic acid, n-pentyl phosphonic acid, neopentyl phosphonic acid, cyclohexyl phosphonic acid, benzyl phosphonic acid, chloromethyl phosphonic acid, dichloromethyl phosphonic acid, bromomethyl phosphonic acid, dibromomethyl phosphonic acid, 2-chloroethyl phosphonic acid, 1,2-dichloroethyl phosphonic acid, 2-bromoethyl phosphonic acid, 1,2-dibromoethyl phosphonic acid, 3-choloropropyl phosphonic acid, 2,3-dichloropropyl phosphonic acid, 3-bromopropyl phosphonic acid, 2,3-dibromopropyl phosphonic acid, 2-chloro-1-methylethyl phosphonic acid, 1,2-dichloro-1-methylethyl phosphonic acid, 2-bromo-1-methylethyl phosphonic acid, 1,2-dibromo-1-methylethyl phosphonic acid, 4-chlorobutyl phosphonic acid, 3,4-dichlorobutyl phosphonic acid, 4-bromobutyl phosphonic acid, 3,4-dibromobutyl phosphonic acid, 3-chloro-1-methylpropyl phosphonic acid, 2,3-dichloro-1-methylpropyl phosphonic acid, 3-bromo-1-methylpropyl phosphonic acid, 2,3-dibromo-1-methyl phosphonic acid, 1-chloromethylpropyl phosphonic acid, 1-chloro-1-chloromethylpropyl phosphonic acid, 1-bromomethylpropyl phosphonic acid, 1-bromo-1-bromomethylpropyl phosphonic acid, 5-chloropentyl phosphonic acid, 4,5-dichloropentyl phosphonic acid, 5-bromopentyl phosphonic acid, 4,5-dibromopentyl phosphonic acid, 1-hydroxymethyl phosphonic acid, 2-hydroxyethyl phosphonic acid, 3-hydroxypropyl phosphonic acid, 4-hydroxybutyl phosphonic acid, 5-hydroxypentyl phosphonic acid, 1-aminomethyl phosphonic acid, 2-aminoethyl phosphonic acid, 3-aminopropyl phosphonic acid, 4-aminobutyl phosphonic acid, 5-aminopentyl phosphonic acid, methylthiomethyl phosphonic acid, methylthioethyl phosphonic acid, methylthiopropyl phosphonic acid, methylthiobutyl phosphonic acid, ethylthiomethyl phosphonic acid, ethylthioethyl phosphonic acid, ethylthiopropyl phosphonic acid, propylthiomethyl phosphonic acid, propylthioethyl phosphonic acid, butylthioethyl phosphonic acid, phenyl phosphonic acid, 4-chlorophenyl phosphonic acid, 3,4-dichlorophenyl phosphonic acid, 3,5-dichlorophenyl phosphonic acid, 4-bromophenyl phosphonic acid, 3,4-bromophenyl phosphonic acid, 3,5-bromophenyl phosphonic acid, 4-methoxyphenyl phosphonic acid, 3,4-dimethoxyphenyl phosphonic acid, 1-naphtyl phosphonic acid, 2-naphtyl phosphonic acid, 5,6,7,8-tetrahydro-2-naphthyl phosphonic acid, 5,6,7,8-tetrahydro-1-naphthyl phosphonic acid, benzyl phosphonic acid, 4-bromophenylmethyl phosphonic acid, 3,4-dibromophenylmethyl phosphonic acid, 3,5-dibromophenylmethyl phosphonic acid, 2-phenylethyl phosphonic acid, 2-(4-bromophenyl)ethyl phosphonic acid, 2-(3,4-dibromophenyl)ethyl phosphonic acid, 2-(3,5-dibromophenyl)ethyl phosphonic acid, 3-phenylpropyl phosphonic acid, 3-(4-bromophenyl)propyl phosphonic acid, 3-(3,4-dibromophenyl)propyl phosphonic acid, 3-(3,5-dibromophenyl)propyl phosphonic acid, 4-phenylbutyl phosphonic acid, 4-(4-bromophenyl)butyl phosphonic acid, 4-(3,4-dibromophenyl)butyl phosphonic acid, 4-(3,5-dibromophenyl)butyl phosphonic acid, 2-pyridyl phosphonic acid, 3-pyridyl phosphonic acid, 4-pyridyl phosphonic acid, 1-pyrrolidinomethyl phosphonic acid, 1-pyrrolidinoethyl phosphonic acid, 1-pyrrolidinopropyl phosphonic acid, 1-pyrrolidinobutyl phosphonic acid, pyrrole-1-phosphonic acid, pyrrole-2-phosphonic acid, pyrrole-3-phosphonic acid, thiophene-2-phosphonic acid, thiophene-3-phosphonic acid, dithian-2-phosphonic acid, trithian-2-phosphonic acid, furan-2-phosphonic acid, furan-3-phosphonic acid, vinyl phosphonic acid, allyl phosphonic acid and the corresponding thiophosphonic acids wherein the oxygen atom in the phosphonic acid bonded to the phosphorus atom by a double bond is replaced with a sulfur atom. These can be used alone or in admixture of two or more kinds. These phosphonic acids may be phosphonic acid derivatives such as an acid chloride, ester, or amide.

These phosphonic acid residues may be partly replaced with phosphonite residues which are corresponding trivalent phosphorus functional groups. Such replacement can impart oxidation resistance to the resin; however, the substitution ratio is preferably up to 50%, more preferably up to 25%, and most preferably up to 10% from the viewpoint of the stability of characteristics such as optical characteristics.

Examples of dihydric phenols constituting the dihydric phenol residues represented by structural formula (2) or (5) include 1,1-bis(4-hydroxyphenyl)methane, 1,1-bis(4-hydroxyphenyl)ethane, 1,1-bis(4-methyl-2-hydroxyphenyl) methane, 1,1-bis(3,5-dimethyl-4-hydroxyphenyl)methane, 2,2-bis(4-hydroxyphenyl)-4-methylpentane, 1,1-bis(4-hydroxyphenyl)cyclohexane, 1,1-bis(4-hydroxyphenyl) cycloheptane, 1,1-bis(4-hydroxyphenyl)cyclooctane, 1,1-bis(4-hydroxyphenyl)cyclodecane, 1,1-bis(4-hydroxyphenyl) cyclododecane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)-1-phenylethane, 1,1-bis(4-hydroxyphenyl)-2-ethylhexane, 2,2-bis(3-phenyl-4-hydroxyphenyl)propane, 1,1-bis(3-methyl-4-hydroxyphenyl)methane, 4,4'-biphenol, 2,2-bis(4-hydroxyphenyl)butane, 1,1-bis(4-hydroxyphenyl)-2-methylpropane, 1,1-bis(4-hydroxyphenyl)-1-phenylmethane, 2,2-bis(4-hydroxyphenyl)octane, 1,1-bis(3-methyl-4-hydroxyphenyl)cyclohexane, 2,2-bis(3-allyl-4-hydroxyphenyl)propane, 2,2-bis(3-isopropyl-4-hydroxyphenyl)propane, 2,2-bis(3-tert-butyl-4-hydroxyphenyl)propane, 2,2-bis(3-sec-butyl-4-hydroxyphenyl)propane, bisphenol floren, 1,1-bis(2-methyl-4-hydroxy-5-tert-butylphenyl)-2-methylpropane, 4,4'-[1,4-phenylene-bis(2-propylidene)]-bis(2-methylphenol), 1,1-bis(3-phenyl-4-hydroxyphenyl)cyclohexane, 4,4'-dihydroxyphenylether, 1,1-bis(2-hydroxyphenyl)methane, 2,4'-methylenebisphenol, 1,1-bis(3-methyl-4-hydroxyphenyl)methane, 1,1-bis(4-hydroxyphenyl)propane, 1,1-bis(2-hydroxy-5-methylphenyl)ethane, 1,1-bis(4-hydroxyphenyl)-3-methyl-butane, 1,1-bis(2-hydroxy-3,5-dimethylphenyl)methane, 1,1-bis(4-hydroxyphenyl) cyclopentane, 1,1-bis(3-methyl-4-hydroxyphenyl) cyclopentane, 3,3-bis(4-hydroxyphenyl)pentane, 3,3-bis(3-methyl-4-hydroxyphenyl)pentane, 3,3-bis(3,5-dimethyl-4-hydroxyphenyl)pentane, 2,2-bis(2-hydroxy-3,5-dimethylphenyl)propane, 2,2-bis(4-hydroxyphenyl)nonane, 1,1-bis(3-methyl-4-hydroxyphenyl)-1-phenylethane, 1,1,-bis(3,5-dimethyl-4-hydroxyphenyl)cyclohexane, 2,2-bis(4-hydroxyphenyl)decane, 1,1-bis(4-hydroxyphenyl)decane, 1,1-bis(2-hydroxy-3-tert-butyl-5-methylphenyl)methane, 1,1-bis(4-hydroxyphenyl)diphenylmethane, terpenediphenol, 1,1-bis(3-tert-butyl-4-hydroxyphenyl) cyclohexane, 1,1-bis(2-methyl-4-hydroxy-5-tert-butylphenyl)-2-methylpropane, 2,2-bis(3-cyclohexyl-4-hydroxyphenyl)propane, 1,1-bis(3,5-di-tert-butyl-4-hydroxyphenyl)methane, 1,1-bis(3,5-disec-butyl-4-hydroxyphenyl)methane, 1,1-bis(3-cyclohexyl-4-hydroxyphenyl)cyclohexane, 1,1-bis(2-hydroxy-3,5-di-tert-butylphenyl)ethane, 1,1,-bis(3-nonyl-4-hydroxyphenyl) methane, 2,2,-bis(3,5-di-tert-butyl-4-hydroxyphenyl) propane, 1,1-bis(2-hydroxy-3,5-di-tert-butyl-6-methylphenyl)methane, 1,1-bis(3-phenyl-4-hydroxyphenyl)-1-phenylethane, 4,4-bis(4-hydroxyphenyl) pentanoic acid, bis(4-hydroxyphenyl)acetic butyl ester, 1,1-bis(3-fluoro-4-hydroxyphenyl)methane, 1,1-bis(2-hydroxy-5-fluorophenyl)methane, 2,2-bis(4-hydroxyphenyl)-1,1,1,3,3,3-hexafluoropropane, 2,2-bis(3-fluoro-4-hydroxyphenyl) propane, 1,1-bis(3-fluoro-4-hydroxyphenyl)-1-phenylmethane, 1,1-bis(3-fluoro-4-hydroxyphenyl)-1-(p-fluorophenyl)methane, 1,1-bis(4-hydroxyphenyl)-1-(p-fluorophenyl)methane, 2,2-bis(3-chloro-4-hydroxy-5-methylphenyl)propane, 2,2-bis(3,5-dichloro-4-hydroxyphenyl)propane, 2,2-bis(3-chloro-4-hydroxyphenyl)propane, 1,1-bis(3,5-dibromo-4-hydroxyphenyl)methane, 2,2-bis(3,5-dibromo-4-hydroxyphenyl)propane, 2,2-bis(3-nitro-4-hydroxyphenyl) propane, 3,3'-dimethyl-4,4'-biphenol, 3,3',5,5'-tetramethyl-4,4'-biphenol, 3,3',5,5'-tetra-tert-butyl-4,4'-biphenol, bis(4-hydroxyphenyl)ketone, 3,3'-difluoro-4,4'-biphenol, 3,3',5,5'-tetrafluoro-4,4'-biphenol, bis(4-hydroxyphenyl) dimethylsilane, bis(4-hydroxyphenyl)sulfone, bis(3-methyl-4-hydroxyphenyl)sulfone, bis(3,5-dimethyl-4-hydroxyphenyl)sulfone, bis(3,5-dibromo-4-hydroxyphenyl) sulfone, bis(4-hydroxyphenyl)thioether, bis(3-methyl-4-hydroxyphenyl)ether, bis(3-methyl-4-hydroxyphenyl) thioether, bis(3,5-dimethyl-4-hydroxyphenyl)ether, bis(3,5- dimethyl-4-hydroxyphenyl)thioether, 1,1-bis(2,3,5-trimethyl-4-hydroxyphenyl)-1-phenylmethane, 2,2-bis(4-hydroxyphenyl)dodecane, 2,2-bis(3-methyl-4-hydroxyphenyl)dodecane, 2,2-bis(3,5-dimethyl-4-hydroxyphenyl)dodecane, 1,1-bis(3-tert-butyl-4-hydroxyphenyl)-1-phenylethane, 1,1-bis(3,5-di-tert-butyl-4-hydroxyphenyl)-1-phenylethane, 1,1-bis(2-methyl-4-hydroxy-5-cylcohexylphenyl)-2-methylpropane, 1,1-bis(2-hydroxy-3,5-di-tert-butylphenyl)ethane, 2,2-bis(4-hydroxyphenyl)propanoic acid methyl ester, 2,2-bis(4-hydroxyphenyl)propanoic acid ethyl ester, isatin bisphenol, isatin biscresol, 2,2',3,3',5,5'-hexamethyl-4,4'-biphenol, bis(2-hydroxyphenyl)methane, 2,4'-methylenebisphenol, 1,2-bis(4-hydroxyphenyl)ethane, 2-(4-hydroxyphenyl)-2-(2-hydroxyphenyl)propane, bis(2-hydroxy-3-allylphenyl) methane, 1,1-bis(2-hydroxy-3,5-dimethylphenyl)-2-methylpropane, 1,1-bis(2-hydroxy-5-tert-butylphenyl) ethane, bis(2-hydroxy-5-phenylphenyl)methane, 1,1-bis(2-methyl-4-hydroxy-5-tert-butylphenyl)butane, bis(2-methyl-4-hydroxy-5-cyclohexylphenyl)methane, 2,2-bis(4-hydroxyphenyl)pentadecane, 2,2-bis(3-methyl-4-hydroxyphenyl)pentadecane, 2,2-bis(3,5-dimethyl-4-hydroxyphenyl)pentadecane, 1,2-bis(3,5-di-tert-butyl-4-hydroxyphenyl)ethane, bis(2-hydroxy-3,5-di-tert-butylphenyl)methane, 2,2-bis(3-styryl-4-hydroxyphenyl) propane, 1,1-bis(4-hydroxyphenyl)-1-(p-nitrophenyl) ethane, bis(3,5-difluoro-4-hydroxyphehyl)methane, bis(3,5-difluoro-4-hydroxyphenyl)-1-phenylmethane, bis(3,5-difluoro-4-hydroxyphenyl)diphenylmethane, bis(3-fluoro-4-hydroxyphenyl)diphenylmethane, 2,2-bis(3-chloro-4-hydroxyphenyl)propane, 3,3',5,5'-tetra-tert-butyl-2,2'-biphenol, 2,2'-diallyl-4,4'-biphenol, 1,1-bis(4-hydroxyphenyl)-3,3,5,-trimethyl-cyclohexane, 1,1-bis(4-hydroxyphenyl)-3,3,5,5,-tetramethyl-cyclohexane, 1,1-bis(4-hydroxyphenyl)-3,3,4-trimethyl-cyclohexane, 1,1-bis(4-hydroxyphenyl)-3,3-dimethyl-5-ethyl-cyclohexane, 1,1-bis(4-hydroxyphenyl)-3,3,5-trimethyl-cyclopentane, 1,1-bis(3,5-dimethyl-4-hydroxyphenyl)-3,3,5-trimethyl-cyclohexane, 1,1-bis(3,5-diphenyl-4-hydroxyphenyl)-3,3,5-trimethyl-cyclohexane, 1,1-bis(3-methyl-4-hydroxyphenyl)-3,3,5-trimethyl-cyclohxane, 1,1-bis(3-phenyl-4-hydroxyphenyl)-3,3,5-trimethyl-cyclohexane,1,1-bis(3,5-dichloro-4-hydroxyphenyl)-3,3,5-trimethyl-cyclohexane, 9,9-bis(4-hydroxyphenyl)fluorene, 9,9-bis(3,5-dimethyl-4-hydroxyphenyl)fluorene, 1,1-bis(3,5-dibromo-4-hydroxyphenyl)-3,3,5-trimethyl.-cyclohexane, α,α-bis(4-hydroxyphenyl)-1,4-diisopropylbenzene and the like and these can be used alone or in admixture of two or more kinds. These dihydric phenols can be employed according to the properties of the desired polymer.

Dihydroxybenzene can be employed in such an amount that does not mar the effect of the present invention and examples of these dihydroxybenzenes include resorcinol, hydroquinone, 1,2-dihydroxybenzene and the like. These can be used alone or in admixture of two or more kinds.

The polymer of the present invention is not necessarily linear and polyhydric phenols can be copolymerized according to the properties of the desired polymer. Examples of such polyhydric phenols include tris(4-hydroxyphenyl) methane, 4,4'-[1-[4-[1-(4-hydroxyphenyl)-1-methylethyl] phenyl]ethylidene]bisphenol, 2,3,4,4'-tetrahydroxybenzophenone, 4-[bis(4-hydroxyphenyl) methyl]-2-methoxyphenol, tris(3-methyl-4-hydroxyphenyl) methane, 4-[bis(3-methyl-4-hydroxyphenyl)methyl]-2-methoxyphenol, 4-[bis(3,5-dimethyl-4-hydroxyphenyl) methyl]-2-methoxyphenol, 1,1,1-tris(4-hydroxyphenyl) ethane, 1,1,1-tris(3-methyl-4-hydroxyphenyl)ethane, 1,1,1-tris(3,5-dimethyl-4-hydroxyphenyl)ethane, tris(3-methyl-4-hydroxyphenyl)methane, tris(3,5-dimethyl-4-hydroxyphenyl)methane, 2,6-bis[(2-hydroxy-5-methylphenyl)methyl]-4-methylphenol, 4-[bis(3,5-dimethyl-4-hydroxyphenyl)methyl]-1,2-dihydroxybenzene, 2-[bis(2-methyl-4-hydroxy-5-cyclohexylphenyl)methyl]-phenol, 4-[bis(2-methyl-4-hydroxy-5-cyclohexylphenyl) methyl]-1,2-dihydroxybenzene, 4-methylphenyl-1,2,3-trihydroxybenzene, 4-[(4-hydroxyphenyl)methyl]-1,2,3-trihydroxybenzene, 4-[1-(4-hydroxyphenyl)-1-methylethyl]-1,3-dihydroxybenzene, 4-[(3,5-dimethyl-4-hydroxyphenyl)methyl]-1,2,3-trihydroxybenzene, 1,4-bis [1-bis(3,4-dihydroxyphenyl)-1-methyl-ethyl]benzene, 1,4-bis[1-bis(2,3,4-trihydroxyphenyl)-1-methyl-ethyl]benzene, 2,4-bis[(4-hydroxyphenyl)methyl]-1,3-dihydroxybenzene, 2-[bis(3-methyl-4-hydroxyphenyl)methyl]phenol, 4-[bis(3-methyl-4-hydroxyphenyl)methyl]phenol, 2-[bis(2-methyl-4-hydroxyphenyl)methyl]phenol, 4-[bis(3-methyl-4-hydroxyphenyl)methyl]-1,2-dihydroxybenzene, 4-[bis(4-hydroxyphenyl)methyl]-2-ethoxyphenol, 2-[bis(2,3-dimethyl-4-hydroxyphenyl)methyl]phenol, 4-[bis(3,5-dimethyl-4-hydroxyphenyl)methyl]phenol, 3-[bis(3,5-dimethyl-4-hydroxyphenyl)methyl]phenol, 2-[bis(2-hydroxy-3,6-dimethylphenyl)methyl]phenol, 4-[bis(2-hydroxy-3,6-dimethylphenyl)methyl]phenol, 4-[bis(3,5-dimethyl-4-hydroxyphenyl)methyl]-2-methoxyphenol, 3,6-[bis(3,5-dimethyl-4-hydroxyphenyl)methyl]-1,2-dihydroxybenzene, 4,6-[bis(3,5-dimethyl-4-hydroxyphenyl) methyl]-1,2,3-trihydroxybenzene, 2-[bis(2,3,6-trimethyl-4-hydroxy phenyl)methyl]phenol, 2-[bis(2,3,5-trimethyl-4-hydroxy phenyl)methyl]phenol, 3-[bis(2,3,5-trimethyl-4-hydroxy phenyl)methyl]phenol, 4-[bis(2,3,5-trimethyl-4-hydroxy phenyl)methyl]phenol, 4-[bis(2,3,5-trimethyl-4-hydroxy phenyl)methyl]-1,2-dihyroxybenzene, 3-[bis(2-methyl-4-hydroxy-5-cyclohexylphenyl)methyl]phenol, 4-[bis(2-methyl-4-hydroxy-5-cyclohexylphenyl)methyl] phenol, 4-[bis(2-methyl-4-hydroxy-5-cyclohexylphenyl) methyl]-2-methoxyphenol, 2,4,6-[tris(4-hydroxyphenylmethyl)-1,3-dihydroxybenzene, 1,1,2,2-tetra (3-methyl-4-hydroxyphenyl)ethane, 1,1,2,2-tetra(3,5-dimethyl-4-hydroxyphenyl)ethane, 1,4-[[bis(4-hydroxyphenyl)methyl]]benzene, 1,4-di[bis(3-methyl-4-hydroxyphenyl)methyl]benzene, 1,4-di[bis(3,5-dimethyl-4-hydroxyphenyl)methyl]benzene, 4-[1,1-bis(4-hydroxyphenyl)ethyl]aniline, (2,4-dihyroxyphenyl)(4-hydroxyphenyl)ketone, 2-[bis(4-hydroxypheny)methyl] phenol, 1,3,3-tri(4-hydroxyphenyl)butane and the like. These can be used alone or in admixture of two or more kinds.

A general method of preparing a polymer of the present invention includes a solution polymerization process in which an acid halide and a dihydric phenol are reacted in an organic solvent (A.Conix, Ind. Eng. Chem. 51 147(1959), Japanese Examined Patent No. Sho 37-5599), a molten polymerization process in which an acid halide and a dihydric phenol are heated in the presence of a catalyst such as magnesium chloride, another molten polymerization process in which a divalent acid and a dihydric phenol are heated in the presence of diallyl carbonate (Japanese Examined Patent No. Sho 38-26299), and an interfacial polymerization process in which a divalent acid halide dissolved in an organic solvent that is not compatible with water is mixed with a dihydric phenol dissolved in an alkali aqueous solution (W. M. Eareckson, J. Poly. Sci. XL 399 (1959), Japanese Examined Patent Application publication No. Sho 40-1959) and the like, but the solution polymerization process is employed particularly advantageously. In one exemplary solution polymerization process, a phosphonic acid derivative which is a precursor molecule of a phosphonic acid residue, and a dihydric phenol are mixed and reacted in the presence of a base such as triethyl amine, then a precursor molecule of the carbonate residue such as phosgene or triphosgene is added and subjected to condensation polymerization to produce a resin of the present invention. In this process, a polymer of a higher molecular weight can be produced by adding triphosgene after the addition of the phosphonic acid derivative, and not by adding the phosphonic acid derivative and the triphosgene simultaneously for the reaction. Examples of a phosphonic acid derivative and a carbonate derivative are not particularly limited and halides, acid anhydrides and esters thereof may be employed.

The molecular weight of the polymer of the present invention can be controlled by adding a monofunctional substance during the polymerization process. Examples of the monofunctional substance, which is employed herein as a molecular weight controlling agent, include monohydric phenols such as phenol, cresol, and p-tert-butylphenol, and monovalent acid chlorides such as benzoic acid chloride, methanesulfonyl chloride, and phenyl chloroformate.

Various anti-oxidizing agents such as hindered phenol type, hindered amine type, thioether type and phosphorus type can be added to the polymer of the present invention, in an amount that does not mar the characteristics of the polymer of the present invention.

The polymer of the present invention has high solubility in an organic solvent such as methylene chloride, chloroform, 1,1,2,2-tetrachloroethane, 1,2-dichloroethane, tetrahydrofuran, 1,4-dioxane, toluene, xylene, γ-butyrolactone, benzyl alcohol, isophorone, chlorobenzene, dichlorobenzene, and hexafluoroisopropanol. The polymer of the present invention is amorphous, and the amorphism of the polymer can be confirmed by the presence of a melting point which can be determined by a known method such as differential scanning calorimetry (DSC) or kinetic viscoelasticy measurement and the like.

EXAMPLES

The exemplary embodiments of the present invention will be described with the following examples, but it is to be understood that the present invention is not limited by them.

Example 1

Methylbenzylidene bisphenol (40 mmol) and triethyl amine (88 mmol) were mixed in 1,2-dichloroethane (100 ml) under a nitrogen atmosphere, stirred and cooled on ice. To this solution, phenyl phosphonic acid dichloride (30 mmol) dissolved in 1,2-dichloroethane (45 ml) was added dropwise over 60 minutes, and the solution was stirred at room temperature for 120 minutes after the completion of the addition. Then a 1,2-dichloroethane solution of triphosgene (5.83 ml, 0.571 mol/l) was added thereto dropwise over 30 minutes and the solution was mixed for 120 minutes after the completion of the addition and stirred in an oil bath at 70° C. for 120 minutes, then stirred at a room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water in this order, then dried to produce a desired resin powder in a 89% yield.

The obtained resin powder was molded and evaluated by the following method. For press molding, the obtained resin powder was put into a mold which was heated to 250° C., a temperature higher than the glass transition point of the resin. As for the mold, one with which a circular plate having a diameter of 30 mm can be molded was employed. After the mold was closed, the resin was placed under a pressure of 2 tons and cooled. By splitting the mold, a disc shaped resin plate having a diameter of 30 mm, and a thickness of 3 mm was obtained. For a resin having a lower melt viscosity, the resin can be sealed in a test tube and subjected to melt molding. In this case, 3 g of the obtained resin powder was put into a test tube having an outer diameter of 24 mm and the air was evacuated therefrom and the resin in the test tube under vacuum was heated to 280° C. by a heater. After confirming the resin had melted, the heater was turned off and the test tube was cooled. After the test tube was cooled, the hardening of the resin was confirmed and the lump resin was taken out by breaking only the test tube.

The obtained resin molded sample was sandpapered and buffed. Two major surfaces were planished until they showed a mirror finish.

The planished resin sample was evaluated with a refractometer (KPR-2 produced by Kalnew Kogaku Kogyo K.K.) and the d-line (wavelength: 587.6 nm) refractive index (nd) was measured, and the Abbe number was obtained according to equation (6).

The dynamic characteristics of the obtained resin were evaluated by a bending test which was carried out with Tensilon (Model RTM-100) produced by Orientec Co. on a molded plate having a width of 10 mm, a length of 25 mm, and a thickness of 3 mm under the condition that the distance between supporting points was 22 mm, and the bending speed was 1.5 mm/min. Toughness (bending stress×breaking displacement), which is an index showing fragility, was employed as the evaluation parameter.

Example 2

Methylbenzylidene bisphenol (40 mmol), pentaerythrityltetrakis[3-(3,5-di-t-butyl-4-hydroxyphenyl)propionate] (0.15 g) and triethylamine (88 mmol) were mixed in 1,2-dichloroethane (100 ml) under a nitrogen atmosphere, stirred and cooled on ice. To this solution, phenylthio phosphonic acid dichloride (30 mmol) in 1,2-dichloroethane (45 ml) was added dropwise over 60 minutes, the solution was stirred at room temperature for 120 minutes after the completion of the addition. Then a 1,2-dichloroethane solution of triphosgene (5.83 ml, 0.571 mol/l) was added thereto dropwise over 30 minutes, then stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water, in this order, then dried to give a desired resin powder at a 90% yield. The resin was molded in a process analogous to that of Example 1 and evaluated.

Example 3

1,1-Bis(4-hydroxyphenyl)cyclohexane (40 mmol) and triethylamine (88 mmol) were mixed in 1,2-dichloroethane (100 ml) under a nitrogen atmosphere, stirred and cooled on ice. To this solution, phenyl phosphonic acid dichloride (30 mmol) in 1,2-dichloroethane (45 ml) was added dropwise over 60 minutes, and the solution was stirred at room temperature for 120 minutes after the completion of the addition. Then a 1,2-dichloroethane solution of triphosgene (5.83 ml, 0.571 mol/l) was added thereto dropwise over 30 minutes, and the solution was stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water in this order, then dried to give a desired resin powder at a 91% yield. The resin was molded in a process analogous to that of Example 1 and evaluated.

Example 4

1,1-Bis(4-hydroxyphenyl)cyclohexane (40 mmol), pentaerythrityl-tetrakis[3-(3,5-di-t-butyl-4-hydroxyphenyl) propionate] (0.15 g) and triethylamine (88 mmol) were mixed in 1,2-dichloroethane (100 ml) under a nitrogen atmosphere, stirred and cooled on ice. To this solution, phenylthio phosphonic acid dichloride (30 mmol) in 1,2-dichloroethane (45 ml) was added dropwise over 60 minutes, and the solution was stirred at room temperature for 120 minutes after the completion of the addition. Then a 1,2-dichloroethane solution of triphosgene (5.83 ml, 0.571 mol/l) was added thereto dropwise over 30 minutes, then stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water, in this order, then dried to give a desired resin powder at a 92% yield. The resin was molded in a process analogous to that of Example 1 and evaluated.

Example 5

1,1-Bis(4-hydroxyphenyl)cyclohexane (32 mmol), α,α-bis(4-hydroxyphenyl)-1,4-diisopropylbenzene (8 mmol), and triethylamine (88 mmol) were mixed in 1,2-dichloroethane (100 ml) under a nitrogen atmosphere, stirred and cooled on ice. To this solution, phenyl phosphonic acid dichloride (32 mmol) in 1,2-dichloroethane (45 ml) was added dropwise over 60 minutes, the solution was stirred at room temperature for 120 minutes after the completion of the addition. Then a 1,2-dichloroethane solution of triphosgene (4.66 ml, 0.571 mol/l) was added thereto dropwise over 30 minutes, then stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water in this order, then dried to give a desired resin powder at a 88% yield. The resin was molded in a process analogous to that of Example 1 and evaluated.

Example 6

1,1-Bis(4-hydroxyphenyl)cyclohexane (36 mmol), α,α-bis(4-hydroxyphenyl)-1,4-diisopropylbenzene (4 mmol), pentaerythrityl-tetrakis[3-(3,5-di-t-butyl-4-hydroxyphenyl) propionate](0.15 g) and triethylamine (88 mmol) were mixed in 1,2-dichloroethane (100 ml) under a nitrogen atmosphere, stirred and cooled on ice. To this solution, phenyl phosphonic acid dichloride (30 mmol) in 1,2-dichloroethane (45 ml) was added dropwise over 60 minutes, the solution was stirred at room temperature for 120 minutes after the completion of the addition. Then a 1,2-dichloroethane solution of triphosgene (5.83 ml, 0.571 mol/l) was added thereto dropwise over 30 minutes, then stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water, in this order, then dried to give a desired resin powder at a 90% yield. The resin was molded in a process analogous to that of Example 1 and evaluated.

Example 7

1,1-Bis(4-hydroxyphenyl)cyclohexane (40 mmol) and triethylamine (88 mmol) were mixed in 1,2-dichloroethane (100 ml) under nitrogen atmosphere, stirred and cooled on ice. To this solution, 1,2-dichloroethane solution of triphosgene (1.75 ml, 0.571 mol/l) was added dropwise. Then phenylthio phosphonic acid dichloride (29.6 mmol) in 1,2-dichloroethane (45 ml) was added dropwise over 60 minutes, then benzenephosphonous dichloride (0.4 mmol) in 1,2-dichloroethane (15 ml) was added dropwise, and the solution was stirred at room temperature for 120 minutes after the completion of the addition. Then a 1,2-dichloroethane solution of triphosgene (4.08 ml, 0.571 mol/l) was added thereto dropwise over 30 minutes, then stirred for 120 minutes after the completion of the addition. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water in this order, then dried to give a desired resin powder at a 94% yield. The resin was molded in a process analogous to that of Example 1 and evaluated.

Example 8

1,1-Bis(4-hydroxyphenyl)cyclohexane (36 mmol), α,α-bis(4-hydroxyphenyl)-1,4-diisopropylbenzene (4 mmol), pentaerythrityl-tetrakis[3-(3,5-di-t-butyl-4-hydroxyphenyl) propionate](0.15 g) and triethylamine (88 mmol) were mixed in 1,2-dichloroethane (100 ml) under a nitrogen atmosphere, stirred and cooled on ice. To this solution, phenylthio phosphonic acid dichloride (27 mmol) and benzenephosphonous dichloride (3 mmol) dissolved in 1,2-dichloroethane (45 ml) were added dropwise over 60 minutes, and the solution was stirred at room temperature for 120 minutes after the completion of the addition. Then a 1,2-dichloroethane solution of triphosgene (5.83 ml, 0.571 mol/l) was added thereto dropwise and stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water, in this order, then dried to give a desired resin powder at a 94% yield. The resin was molded in a process analogous to that of Example 1 and evaluated.

Example 9

1,1-Bis(4-hydroxyphenyl)cyclododecane (40 mmol) and triethylamine (88 mmol) were mixed in 1,2-dichloroethane (100 ml) under a nitrogen atmosphere, stirred and cooled on ice. To this solution, phenyl phosphonic acid dichloride (30 mmol) dissolved in 1,2-dichloroethane (45 ml) was added dropwise over 60 minutes, and the solution was stirred at room temperature for 120 minutes after the completion of the addition. Then a 1,2-dichloroethane solution of triphosgene (5.83 ml, 0.571 mol/l) was added thereto dropwise over 30 minutes, and stirred for 120 minutes after the completion of the addition.

The solution was then stirred in an oil bath at 70° C. for 120 minutes, then stirred at room temperature for 12 hours. The reactant mixture was added to 2000 ml of hexane and the polymer was reprecipitated and filtered out then washed with (1) 2000 ml of ethanol, (2) 2000 ml of water/ethanol in a 1/1 mixed solution, and (3) 2000 ml of water, in this order, then dried to give a desired resin powder at a 88% yield. The resin was molded in a process analogous to that of Example 1 and evaluated.

Example 10

Methylbenzylidene bisphenol A (20 mmol) and triethylamine (40 mmol) were mixed in 1,2-dichloroethane (50 ml) under a nitrogen atmosphere, stirred and cooled on ice. To this solution, phenylthio phosphonic acid dichloride (20 mmol) dissolved in 1,2-dichloroethane (60 ml) was added dropwise over 35 minutes, and the solution was stirred at room temperature for 90 minutes after the completion of the addition. Then it was treated in a process analogous to that of Example 1 (the resulting yield was 95%) then molded in a similar process and evaluated.

Example 11

Bisphenol A (20 mmol) and triethylamine (40 mmol) were mixed in 1,2-dichloroethane (50 ml) under nitrogen atmosphere, stirred and cooled on ice. To this solution, phenylthio phosphonic acid dichloride (20 mmol) dissolved in 1,2-dichloroethane (60 ml) was added dropwise over 35 minutes, the solution was stirred at room temperature for 90 minutes after completion of the addition. Then it was treated in a process analogous to that of Example 1 (the resulting yield was 92%) then molded in the similar process and evaluated.

Example 12

The resin obtained in Example 10 and a commercially available polycarbonate, "TARFLON A 2200" (manufactured by Idemitsu Petrochemical Co., Ltd.), were mixed by solution mixing (in 1,2-dichloroethane solution at a concentration of 0.5 mol/l) at 1:1 (in terms of the repeating units) by mol, and treated in a process analogous to that of Example 1 and molded in a similar process and evaluated.

Example 13

The resin obtained in Example 11 and a commercially available polycarbonate, "TARFLON A 2200" (manufactured by Idemitsu Petrochemical Co., Ltd.), were mixed by solution mixing (in 1,2-dichloroethane solution at a concentration of 0.5 mol/l) at 1:1 (in terms of the repeating units) by mol, and treated in a process analogous to that of Example 1 and molded in a similar process and evaluated.

Example 14

The resin obtained in Example 7 was fed into a Sumitomo Nestal Promat 40/25 Injection Molding Machine, manufactured by Sumitomo Heavy Industries, Ltd., in which it was molded into ⅛ inch flammability test pieces at a cylinder temperature of 250° C., and at a mold temperature of 100° C. The test pieces subjected to a vertical combustion test in accordance with UL 94 standard did not fire at all, and the flame retardant resistance corresponded to V-0.

Example 15

The resin obtained in Example 7 (10 parts by weight) and a separately polymerized ABS resin (acrylonitrile:styrene in a 7:3, rubber content of 10%) (100 parts by weight) were subjected to melt-kneading in a double-screw extruder (diameter of 30 mm, L/D=45) at 250° C. and pelletized. After having been dried in hot air, those pellets were fed into a Sumitomo Nestal Promat 40/25 Injection Molding Machine, manufactured by Sumitomo Heavy Industries, Ltd., in which they were molded into ⅛ inch flammability test pieces at a cylinder temperature of 250° C., and at a mold temperature of 70° C. The test pieces subjected to a vertical combustion test in accordance with UL 94 standard showed a flame retardant resistance corresponding to level V-2.

Example 16

Five kilograms of the resin described in Example 7 was synthesized and a film having a width of 200 mm and a thickness of 200 $\mu$m was formed by a solution casting method (1,2-dichloroethane solution). The film was stretched 1.2 times at a stretching temperature of 135° C. and a stretching speed of 180 mm/min.
When the retardation of the film obtained under the above-mentioned conditions at a wavelength of 550 nm was taken as 1, the film showed a retardation at a wavelength of 450 nm of 1.100, and that at a wavelength of 650 nm of 0.942.

Comparative Example 1

A commercially available polycarbonate ("TARFLON A 2200", produced by Idemitsu Petrochemical Co., Ltd.) was molded according to a process analogous to that of Example 1 and evaluated.

Comparative Example 2

A commercially available polycarbonate (methyl methacrylate (polymer), produced by Tokyo Kasei Kogyo Co., Ltd.) was molded according to a process analogous to that of Example 1 and evaluated.

Comparative Example 3

A commercially available polyether sulfone was molded according to a process analogous to that of Example 1 and evaluated.

Comparative Example 4

Bisphenol A (20 mmol) and triethylamine (40 mmol) were mixed in 1,2-dichloroethane (50 ml) under a nitrogen atmosphere, stirred and cooled on ice. To this solution, phenyl phosphonic acid dichloride (20 mmol) dissolved in 1,2-dichloroethane (60 ml) was added dropwise over 35 minutes, and the solution was stirred at room temperature for 90 minutes after completion of the addition. Then it was treated in a process analogous to that of Example 1 (the resulting yield was 85%) then molded in the similar process and evaluated.

Comparative Example 5

The resin obtained in Comparative Example 4 and a commercially available polycarbonate, "TARFLON A 2200" (manufactured by Idemitsu Petrochemical Co., Ltd.), were mixed by solution mixing (in 1,2-dichloroethane solution at a concentration of 0.5 mol/l) at 1:1 (in terms of the repeating units) by mol, and treated in a process analogous to that of Example 1 and molded in a similar process and evaluated.

Comparative Example 6

A film having a width of 200 mm, and a thickness of 200 μm was formed by a solution casting method (1,2-dichloroethane solution) from a commercially available polycarbonate "TARFLON A 2200" (manufactured by Idemitsu Petrochemical Co., Ltd.). The film was stretched 1.2 times at a stretching temperature of 135° C. and a stretching speed of 180 mm/min.

When the retardation of the film obtained under the above-mentioned conditions at a wavelength of 550 nm was taken as 1, the film showed the retardation at a wavelength of 450 nm of 1.092, and that at a wavelength of 650 nm of 0.966. The evaluation results of the resins produced according to the processes shown in Examples 1–13 and Comparative Examples 1–5 are given in Table 1.

TABLE 1

|  | Refractive index | Abbe number | Toughness |
| --- | --- | --- | --- |
| Example 1 | 1.619 | 28.0 | 30 |
| Example 2 | 1.639 | 26.8 | 28 |
| Example 3 | 1.605 | 30.8 | 23 |
| Example 4 | 1.625 | 29.1 | 26 |
| Example 5 | 1.610 | 30.3 | 20 |
| Example 6 | 1.623 | 28.9 | 19 |
| Example 7 | 1.622 | 29.2 | 27 |
| Example 8 | 1.623 | 28.5 | 21 |
| Example 9 | 1.580 | 33.1 | 24 |
| Example 10 | 1.646 | 26.1 | 2 |
| Example 11 | 1.633 | 27.5 | 3 |
| Example 12 | 1.615 | 28.3 | 19 |
| Example 13 | 1.608 | 29.0 | 17 |
| Comparative Example 1 | 1.583 | 30.5 | 30 |
| Comparative Example 2 | 1.492 | 56.0 | 20 |
| Comparative Example 3 | 1.634 | 23.3 | 31 |
| Comparative Example 4 | 1.605 | 29.6 | 1 |
| Comparative Example 5 | 1.594 | 30.0 | 15 |

Comparative Examples show that the conventional representative thermoplastic resins are far from satisfactory for optical applications such as a lens, since those having high refractive indices are of high dispersion and those of low dispersion have low refractive indices. Although the resins of Examples 10 and 11 were fragile, they showed such high refractive indices and high Abbe numbers as to allow compounding with existing polycarbonates (it is shown that the optical characteristics of the compounded resins are the averaged values of those of the resins compounded). On the other hand, the resin of Comparative Example 4 showed relatively good optical characteristics; however, the mechanical characteristics thereof were insufficient (very fragile) and compounding with polycarbonate improved the mechanical characteristics, and the refractive index was decreased to below 1.6. On the contrary, the resins according to the present invention have useful optical characteristics such as high refractive indices and low dispersion as well as good mechanical characteristics. It is clear from Examples 14 and 15 that the resins of the present invention also have excellent flame retardant resistance.

From Example 16 and Comparative Example 6, it is shown that the optical anisotropic product obtained from the resin of the present invention has such wavelength dispersion that the relation between the wavelength and the retardation is more linear than that of the polycarbonate, and thereby the resin of the present invention is shown to be better as a material for an optical retardation film than the conventional polycarbonate.

Industrial Applicability

According to the present invention, resins having high refractive indices and low optical dispersion are provided; which are useful in various applications including a lens and an optical film and the like.

What is claimed is:

1. A product comprising optical material formed from a resin composition comprising:

a carbonate residue;

a phosphonic acid residue represented by structural formula (1)

wherein $R^1$ represents an organic group, $X^1$ represents oxygen, sulfur or selenium; and a dihydric phenol residue represented by structural formula (2)

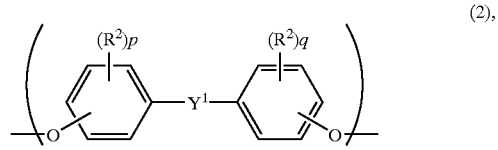

wherein $R^2$ is independently selected from the group consisting of a hydrogen atom, a halogen atom, a hydrocarbyl group and a nitro group, p and q are integers and p+q=0 to 8, and the hydrocarbyl group is selected from the group consisting of an aliphatic group having 1–20 carbon atoms, and an aromatic group, $Y_1$ is selected from the group consisting of a single bond, an oxygen atom, a sulfur atom, an alkylene group, an alkylidene group, a cycloalkylene group, a cycloalkylidene group, a halo-substituted alkylene group, a halo-substituted alkylidene group, a phenylalkylidene group, a carbonyl group, a sulfone group, an aliphatic phosphine oxide group, an aromatic phosphine oxide group, an alkylsilane group, a dialkylsilane group, and a fluorene group, wherein mol fractions of the phosphonic acid residue and the carbonate residue satisfy equation (3)

$$1 > (a)/\{(a)+(b)\} \geq 0.5 \qquad (3),$$

wherein (a) represents the number of moles of phosphonic acid residues, and (b) represents the number of moles of carbonate residues, and the resin composition may contain 1) two or more different phosphonic acid residues having different $R^1$ or $X^1$ and 2) two or more different dihydric phenol residues having different $R^2$ and $Y^1$.

2. The product according to claim 1, wherein a part of the phosphonic acid residue is replaced with a phosphonite residue and the replacement ratio thereof is up to 50%.

3. The product according to claim 1, having an Abbe number not less than 31.

4. The product according to claim 1, having a d-line refractive index of not less than 1.60 and an Abbe number of not less than 26.

5. The product according to claim 1, having a d-line refractive index of not less than 1.62.

6. A molded product comprising the product according to claim 1.

7. An optical lens comprising a molded product according to claim 6.

8. A film comprising the product according to claim 1.

9. An optical retardation film comprising a film according to claim 8 as a structural material.

10. A product which comprises optical material formed from a resin composition comprising:

a phosphonic acid residue represented by structural formula (4)

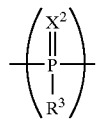

(4), wherein $R^3$ represents an organic group and $X^2$ represents sulfur or selenium; and a dihydric phenol residue represented by structural formula (5)

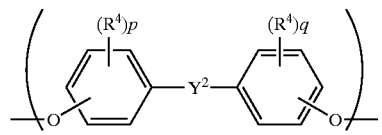

(5), wherein $R^4$ is independently selected from the group consisting of a hydrogen atom, a halogen atom, a hydrocarbyl group and a nitro group, and p and q are integers and p+q=0 to 8, and the hydrocarbyl group is selected from the group consisting of an aliphatic group having 1–2-carbon atoms, and an aromatic group, and $Y^2$ is selected from the group consisting of a single bond, an oxygen atom, a sulfur atom, an alkylene group, an alkylidene group, a cycloalkylene group, a cycloalkylidene group, a halo-substituted alkylene group, a halo-substituted alkylidene group, a phenylalkylidene group, a carbonyl group, a sulfone group, an aliphatic phosphineoxide group, an aromatic phosphineoxide group, an alkylsilane group, a dialkylsilane group, and a fluorene group, and wherein the resin composition may contain 1) two or more different phosphonic acid residues having different $R^3$ or $X^2$ and 2) two or more different dihydric phenol residues having different $R^4$ or $Y^2$.

11. The product according to claim 10 wherein a part of the phosphonic acid residue is replaced with a phosphonite residue and the replacement ratio thereof is up to 50%.

12. The product according to claim 10 having an Abbe number not less than 31.

13. The product according to claim 10, having a d-line refractive index of not less than 1.60 and an Abbe number of not less than 26.

14. An optical lens comprising a molded product according to claim 13.

15. The product according to claim 10, having a d-line refractive index of not less than 1.62.

16. A molded product comprising the product according to claim 10.

17. A film comprising the product according to claim 10.

18. An optical retardation film comprising a film according to claim 17 as a structural material.

19. A resin composition comprising:

a carbonate residue;

a phosphonic acid residue represented by structural formula (1)

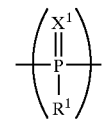

(1), wherein $R^1$ represented an organic group, $X^1$ represents oxygen, sulfur or selenium; and a dihydric phenol residue represented by structural formula (2)

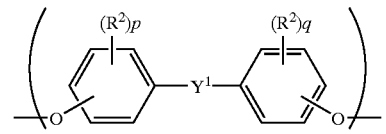

(2), wherein $R^2$ is independently selected from the group consisting of a hydrogen atom, a halogen atom, a hydrocarbyl group and a nitro group, p and q are integers and p+q=0 to 8, and the hydrocarbyl group is selected from the group consisting of an aliphatic group having 1–20 carbon atoms, and an aromatic group, $Y^1$ is selected from the group consisting of a single bond, an oxygen atom, a sulfur atom, an alkylene group, an alkylidene group, a cycloalkyl group, a cycloalkylidene group, a halo-substituted alkylene group, a halo-substituted alkylidene group, a phenylalkylidene group, a carbonyl group, a sulfone group, an aliphatic phosphineoxide group, an aromatic phosphineoxide group, an alkylsilane group, a dialkylsilane group and a fluorene group, wherein mol fractions of the phosphonic acid residue and the carbonate residue satisfy equation (3)

$$1 > (a)/\{(a)+(b)\} \geq 0.5 \quad (3)$$

wherein (a) represents the number of moles of phosphonic acid residues, and (b) represents the number of moles of carbonate residues, and the resin composition may contain 1) two or more different phosphonic residues having different $R^1$ or $X^1$ and 2) two or more different dihydric phenol residues having different $R^2$ or $Y^1$, and wherein the toughness (bending stress×breaking displacement) is 2–30 kgf/mm on a molded plate therefrom having a width of 10 mm, a length of 25 mm, and a thickness of 3 mm.

* * * * *

UNITED STATES PATENT AND TRADEMARK OFFICE
CERTIFICATE OF CORRECTION

PATENT NO. : 6,750,313 B2 Page 1 of 1
APPLICATION NO. : 10/130643
DATED : June 15, 2004
INVENTOR(S) : Takanishi et al.

It is certified that error appears in the above-identified patent and that said Letters Patent is hereby corrected as shown below:

In column 17, at line 42, please change "1-2-" to --1-20--.

Signed and Sealed this

Fourth Day of September, 2007

JON W. DUDAS
*Director of the United States Patent and Trademark Office*